United States Patent
Takehara (10) Patent No.: US 9,141,465 B2
(45) Date of Patent: Sep. 22, 2015

(54) RECEPTION CIRCUIT, INFORMATION PROCESSING APPARATUS, AND CONTROL METHOD

(71) Applicant: FUJITSU LIMITED, Kawasaki-shi (JP)

(72) Inventor: Masaru Takehara, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 305 days.

(21) Appl. No.: 13/793,754

(22) Filed: Mar. 11, 2013

(65) Prior Publication Data

US 2013/0262948 A1  Oct. 3, 2013

(30) Foreign Application Priority Data

Mar. 30, 2012  (JP) ................................ 2012-080442

(51) Int. Cl.
G06F 11/00 (2006.01)
G11C 29/00 (2006.01)
G06F 11/08 (2006.01)
H04L 1/00 (2006.01)
H04L 1/22 (2006.01)

(52) U.S. Cl.
CPC .............. G06F 11/08 (2013.01); H04L 1/0061 (2013.01); H04L 1/22 (2013.01)

(58) Field of Classification Search
CPC ....... G06F 11/08; G06F 11/1012; H04L 1/22; H04L 1/0061
USPC ................. 714/746, 747, 751, 752, 763–764, 714/766–767, 769, 770, 771, 772, 773, 714/819–821, 42–43, 48–49, 52, 56, 701, 714/702, 757, 758, 784; 711/200
See application file for complete search history.

(56) References Cited

U.S. PATENT DOCUMENTS

| | | | |
|---|---|---|---|
| 7,126,943 B2 | 10/2006 | Cucchi et al. | |
| 7,412,642 B2 | 8/2008 | Cypher | |
| 2009/0055713 A1* | 2/2009 | Hong et al. | 714/763 |
| 2011/0231737 A1* | 9/2011 | Dachiku | 714/770 |
| 2012/0233498 A1* | 9/2012 | Ramaraju et al. | 714/23 |

FOREIGN PATENT DOCUMENTS

| | | |
|---|---|---|
| JP | 2002-7312 | 1/2002 |
| JP | 2002-223203 | 8/2002 |

OTHER PUBLICATIONS

Optical Internetworking Forum (OIF): "Very Short Reach (VSR) OC-192/STM-64 Interface Based on Parallel Optics," Implementation Agreement OIP-VSR4-01.0, Dec. 18, 2000, Retrieved from the Internet on Jun. 9, 2006: URL:http://www.oiforum.com/public/documents/OIF-VSR4-01.0.pdf, pp. 1-22.

Extended European Search Report dated Oct. 30, 2013 for corresponding European Application No. 13159152.1.

* cited by examiner

Primary Examiner — Christine Tu
(74) Attorney, Agent, or Firm — Fujitsu Patent Center (57) ABSTRACT

A reception circuit that receives data by serial communication in a plurality of lanes and includes a plurality of error checking units each of which checks presence of an error in the received data, a plurality of memories each of which stores the received data, and a processing unit that reads the received data from the plurality of memories, and outputs a read data. The lanes include a redundant lane that transmits redundant data, the received data is stored in a first area of a plurality of areas included in each of the memories, and other received data received next to the received data is stored in a second area. When there is an error in any one of the pieces of received data stored in the respective first areas, the processing unit generates correct data using the redundant data stored in the first area, and outputs it.

6 Claims, 11 Drawing Sheets

FIG. 1

RELATED ART

F I G. 11

RECEPTION CIRCUIT, INFORMATION PROCESSING APPARATUS, AND CONTROL METHOD

CROSS-REFERENCE TO RELATED APPLICATION

This application is based upon and claims the benefit of priority of the prior Japanese Patent Application No. 2012-080442, filed on Mar. 30, 2012, the entire contents of which are incorporated herein by reference.

FIELD

The embodiments discussed herein are related to a reception circuit that performs serial communication in a plurality of lanes, an information processing apparatus that includes the reception circuit, and a control method.

BACKGROUND

When serial communication is performed between ports in a plurality of lanes, a transmission circuit of a connection source port divides transmission data into the number of lanes, and transmission of the divided pieces of data is performed in the lanes, respectively. A reception circuit of a connection destination port restores the pieces of data that are received in the lanes.

Figure 1:
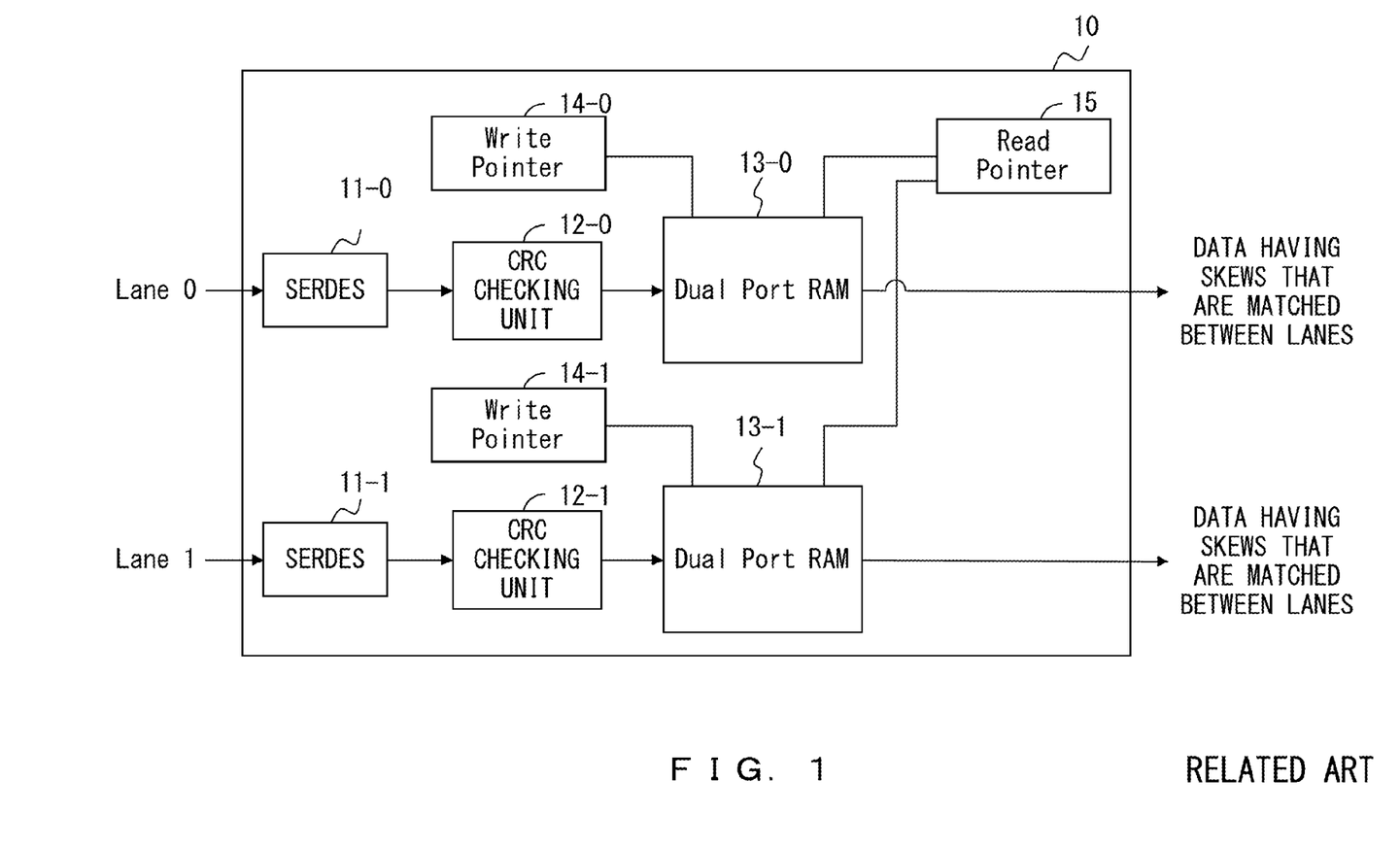
FIG. 1 is a configuration diagram of a conventional reception circuit.

FIG. 1 is a configuration diagram of a conventional reception circuit.

FIG. 1 is the configuration diagram of the reception circuit that uses two lanes (a lane 0 and a lane 1).

A reception circuit 10 includes SERializer/DESerializer (SerDes) 11-i (i=0 to 1), cyclic redundancy check (CRC) checking units 12-i, dual port random access memories (RAM) 13-i, write pointers 14-i, and a read pointer 15.

The SerDes 11-i, the CRC checking units 12-i, the dual port RAM 13-i, and the write pointers 14-i process data of the lanes i.

The SerDes 11 is a circuit that performs interconverts between serial data and parallel data. In the reception circuit 10, the SerDes 11 converts the received serial data into parallel data.

The CRC checking unit 12 performs error checking of data using CRC.

The dual port RAM 13 is a storage device that stores data. The dual port RAM 13 writes data to a position that is indicated by a write pointer value, and reads data from a position that is indicated by a read pointer value.

The write pointer 14 transmits a write pointer value that indicates a writing position of data to the dual port RAM 13.

The read pointer 15 transmits a read pointer value that indicates a reading position of data to the dual port RAM 13. The read pointer 15 transmits a read pointer value to the dual port RAM 13 so that skews of the lanes are matched. Therefore, pieces of data in which skews are matched between the lanes are output from the dual port RAM 13.

In a conventional reception circuit, when any error is detected in the CRC checking unit for data that is received in the SerDes, the data becomes invalid, and write pointer value are different between the lane because a write pointer value stops in the middle.

Thus, conventionally, clear of a dual port RAM, a write pointer, and a read pointer is performed by reset, and transfer is performed again.

Conventionally, reset is performed at the time of occurrence of errors, and in a time period of the reset, reduction of performance is caused because regular transfer is not performed.

[Patent Document 1] Japanese Laid-Open Patent Publication No. 2002-223203
[Patent Document 2] Japanese Laid-Open Patent Publication No. 2002-7312

SUMMARY

According to an aspect of the invention, a reception circuit receives pieces of data by serial communication in a plurality of lanes.

The reception circuit includes a plurality of error checking units that are provided for lanes, respectively, a plurality of memories that are provided for the lanes, respectively, and a processing unit.

Each of the plurality of error checking units checks presence of an error of received data.

Each of the plurality of memories stores the received data.

The processing unit reads the received data from the plurality of memories at the same reading timing, and outputs the read data.

The plurality of lanes includes a redundant lane that transmits redundant data for the received data.

The received data is stored in a first area of a plurality of areas that are included in each of the plurality of memories, and other received data that is received next to the received data is stored in a second area of the plurality of areas.

When there is an error in any one of the pieces of received data that are stored in the respective first areas of the plurality of memories, the processing unit generates correct data using the redundant data that is stored in the first area of the memory, and outputs the correct data instead of the received data with the error therein.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

The embodiments are described below with reference to accompanying drawings.

Figure 2:
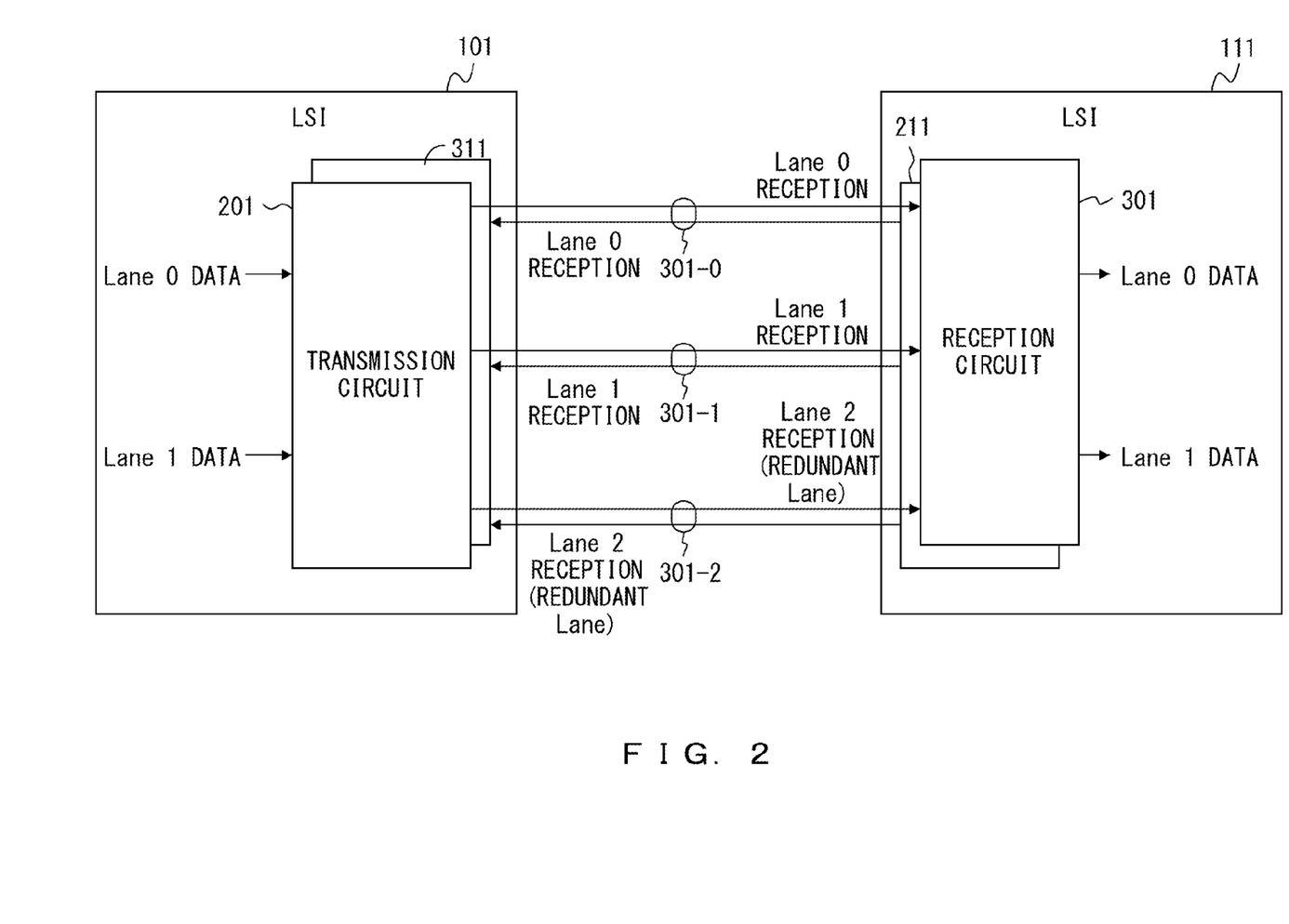
FIG. 2 is an overall diagram of a transmission circuit and a reception circuit according to an embodiment.

FIG. 2 is an overall diagram of a transmission circuit and a reception circuit according to an embodiment.

The transmission circuit and reception circuit according to the embodiment are mounted on large scale integrations (LSI) 101 and 111.

The LSI 101 and 111 are circuits that perform various pieces of processing, for example, an input/output (I/O) controller, an interface controller, a memory controller, etc.

The LSI 101 includes a transmission circuit 201 and a reception circuit 311.

The LSI 111 includes a transmission circuit 211 and a reception circuit 301.

The LSI 101 and the LSI 111 are connected to each other through a multi-lane serial bus.

In the embodiment, communication of the LSI 101 and the LSI 111 is performed through three lanes 301-j (j=0 to 2) as a serial bus. Here, three lanes 301-0, 301-1, 301-2 are referred to as a lane 0, a lane 1, and a lane 2, respectively. In addition, the lane 2 is also referred to as a redundant lane.

A case is described below in which data is transmitted from the LSI 101 to the LSI 111.

In the transmission circuit 201, two pieces of divided data that are obtained by dividing data that is a transmission target is input from an internal circuit of the LSI 101. The two pieces of divided data are referred to as lane 0 data and lane 1 data, respectively.

In the transmission circuit 201, conversion into serial data, addition of CRC, etc. are performed on the lane 0 data and the lane 1 data, and the lane 0 data and the lane 1 data become lane 0 transmission data and lane 1 transmission data, respectively.

The lane 0 transmission data and the lane 1 transmission data are transmitted to the reception circuit 301 through the lane 0 and the lane 1, respectively.

In addition, the transmission circuit 201 generates parity data from lane 0 data and lane 1 data, and transmits the parity data to the reception circuit 301 through the lane 2.

The reception circuit 301 receives lane 0 transmission data and lane 1 transmission data, performs conversion to parallel data and error checking, etc., and outputs lane 0 data and lane 1 data.

In addition, when there is an error in any of the lane 0 transmission data or the lane 1 transmission data, the reception circuit 301 generates correct lane 0 data or lane 1 data using parity data and outputs the generated data.

It is noted that transmission and reception processing of data from the transmission circuit 211 to the reception circuit 311 is similar to the above-described case, and the description is omitted.

Figure 3:
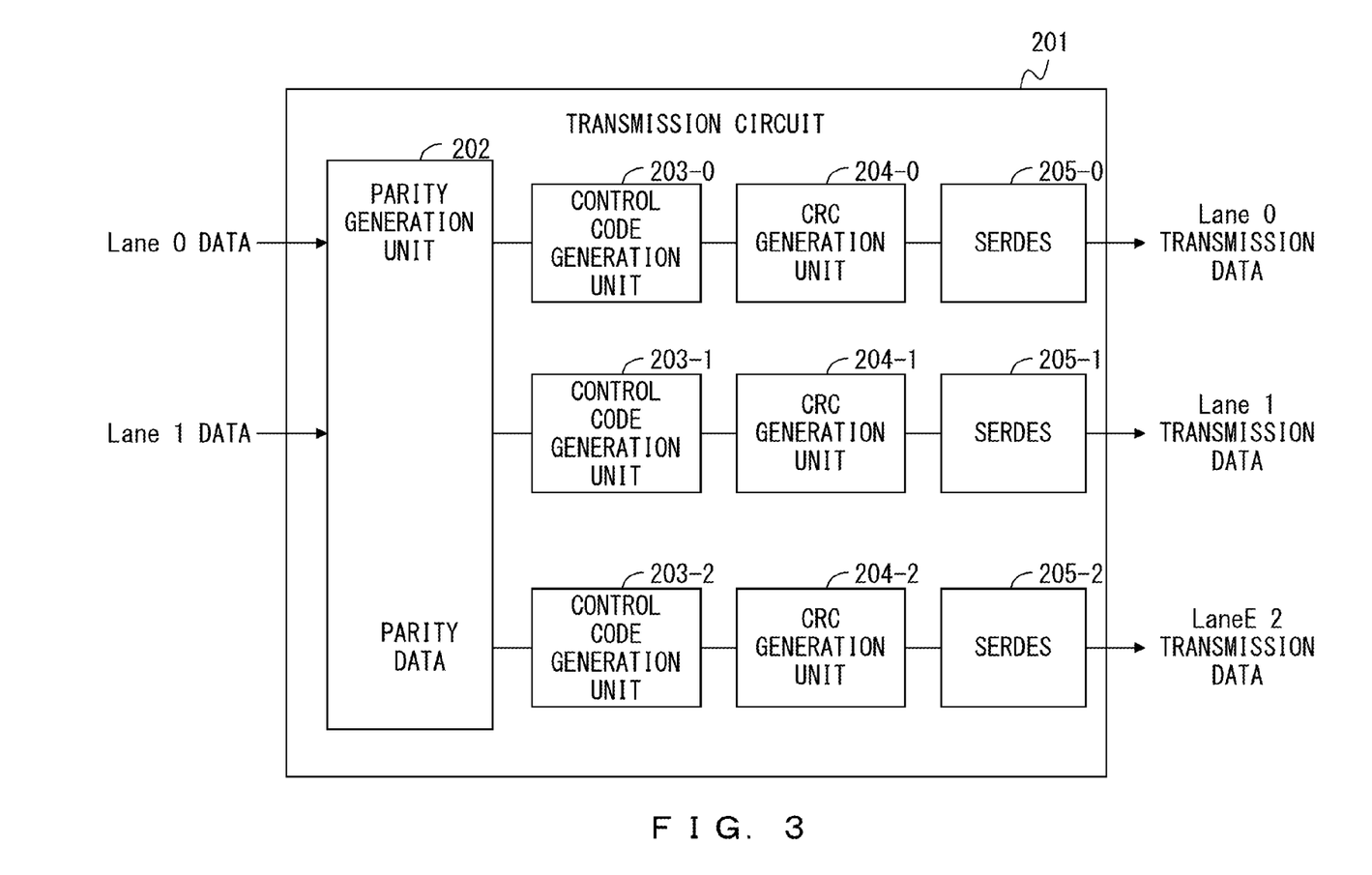
FIG. 3 is a configuration diagram of the transmission circuit according to the embodiment.

FIG. 3 is a configuration diagram of the transmission circuit according to the embodiment.

The transmission circuit 201 includes a parity generation unit 202, control code generation units 203-j (j=0 to 2), CRC generation units 204-j, and SERDES 205-j.

The parity generation unit 202 generates parity data from input lane 0 data and lane 1 data. The parity data is odd parity of the lane 0 data and the lane 1 data.

The parity generation unit 202 outputs the lane 0 data, the lane 1 data, and the parity data to the control code generation units 203-j, respectively.

The control code generation unit 203-0 applies a control code to the input data (that is, the lane 0 data), and outputs the data to the CRC generation unit 204-0. As a control code, for example, there is a start code (/S) that indicates start of data, a termination code (/T) that indicates termination of data, etc. In addition, the control code is, for example, information that is defined by the standard such as IEEE802.3.

The CRC generation unit 204-0 calculates CRC of input data, applies the CRC to the input data, and outputs the data to the SERDES 205-0.

The SERDES 205-0 converts the input data into serial data, and outputs the converted serial data to the lane 0. It is noted that data output to the lane j is referred to as lane j transmission data.

The functions of the control code generation units 203-1 and 203-2, the CRC generation units 204-1 and 204-2, and the SERDES 205-1 and 205-2 are similar to the functions of the above-described control code generation unit 203-0, CRC generation unit 204-0, and SERDES 205-0, and the description is omitted.

Figure 4:
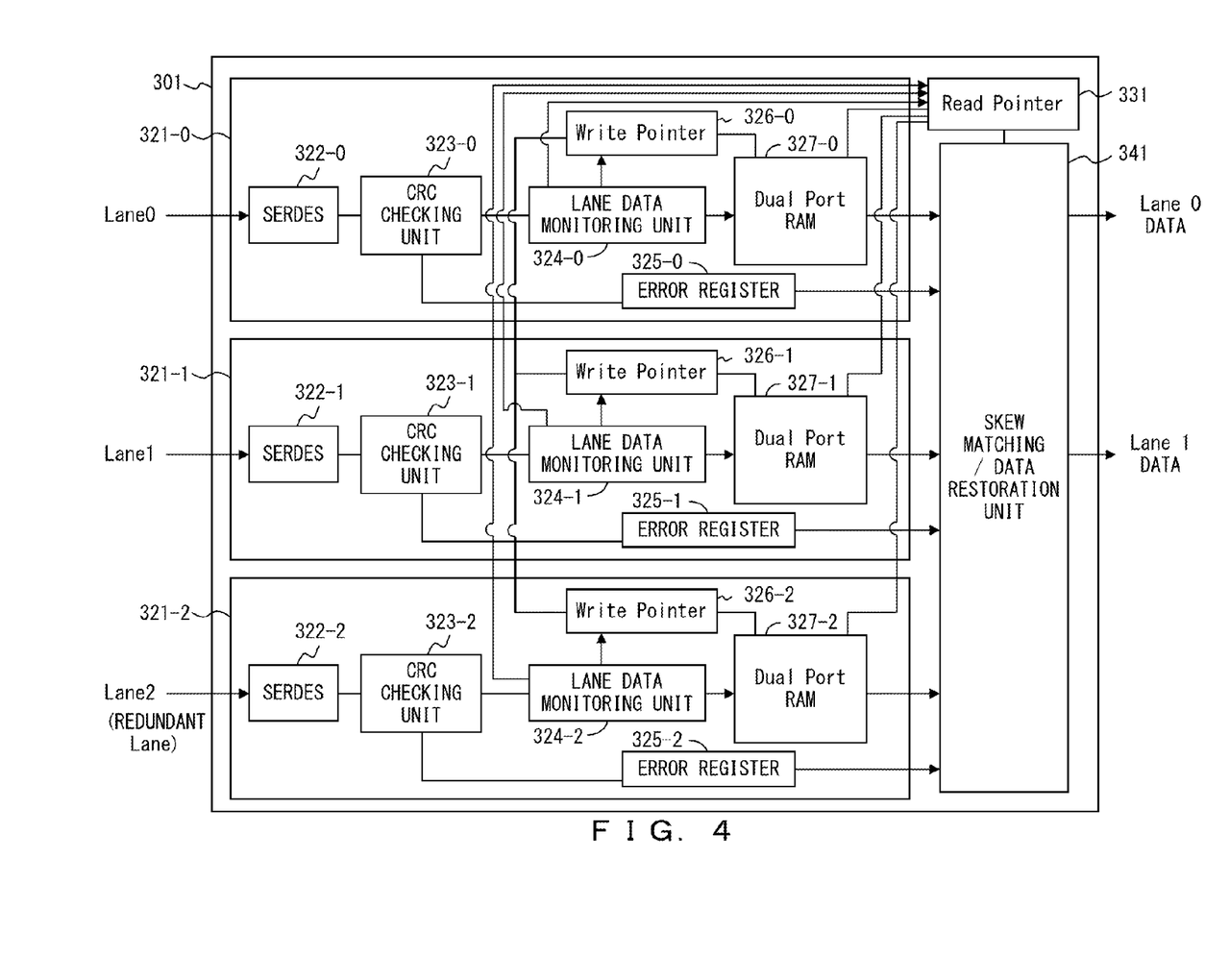
FIG. 4 is a configuration diagram of the reception circuit according to the embodiment.

FIG. 4 is a configuration diagram of the reception circuit according to the embodiment.

The reception circuit 301 includes lane data processing units 321-j, a read pointer 331, and a skew matching/data restoration unit 341.

The lane data processing unit 321-j processes data that is received from the lane j.

The lane data processing unit 321-j includes SERDES 322-j, CRC checking units 323-j, lane data monitoring units 324-j, an error register 325-j, write pointers 326-j, and dual port RAM 327-j.

The SERDES 322-j converts the input data into parallel data, and outputs the converted parallel data to the CRC checking unit 323-j.

The CRC checking unit 323-j checks CRC of the input data, and determines whether or not there is an error. When the CRC checking unit 323-j determines that there is an error, the CRC checking unit 323-j sets information indicating that there is an error to the error register 325-j. The CRC checking unit 323-j outputs the input data to the lane data monitoring unit 324-j.

The lane data monitoring unit 324-j monitors (checks) the input data, and detects a control code. When the lane data monitoring unit 324-j detects a control code such as "/S" or "/T", the detected control code is reported to the write pointer 326-j and the read pointer 331.

The error register 325-j stores information indicating the presence or absence of error in data that is received from the lane j.

The write pointer 326-j outputs a write pointer value that indicates a writing position of data to the dual port RAM 327-j. When the write pointer 326-j receives report of the detection of "/T" from the lane data monitoring unit 324, the write pointer 326-j changes the address of the write pointer value to an addresses in another (next) space.

The dual port RAM 327-j writes the input data to an address that is specified by a write pointer value. The dual port RAM 327-j reads data from an address that is specified by a read pointer value, and outputs the read data to the skew matching/data restoration unit 341.

Data storage of the dual port RAM 327 is described below.

Figure 5:
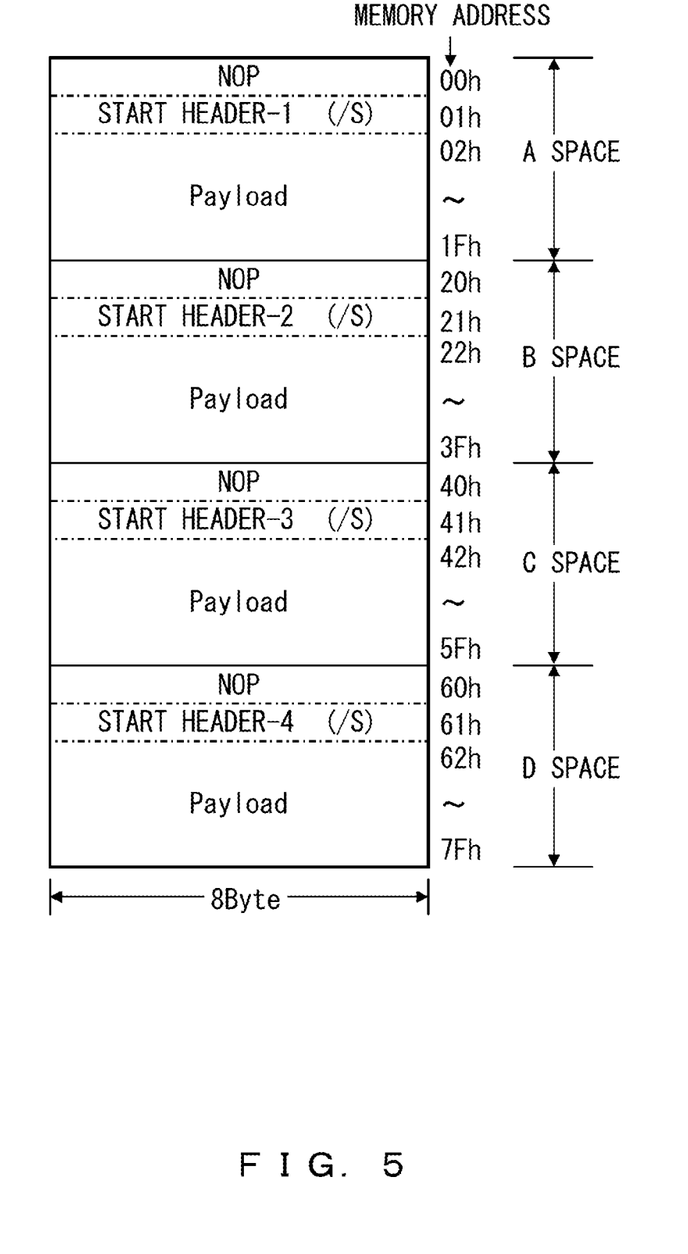
FIG. 5 is a memory map of a dual port RAM according to an embodiment.

FIG. 5 is a memory map of the dual port RAM according to an embodiment.

To the dual port RAM 327, a plurality of spaces (areas) are set.

In the embodiment, four spaces (areas) are set. The four spaces are referred to as an "A" space, a "B" space, a "C" space, and a "D" space, respectively.

The "A" space is an area from addresses 00h to 1Fh.
The "B" space is an area from addresses 20h to 3Fh.
The "C" space is an area from addresses 40h to 5Fh.
The "D" space is an area from addresses 60h to 7Fh.

It is noted that the last "h" included in the numeric characters of the above-described addresses indicates that the addresses are represented by hexadecimal notation.

In the embodiment, in the leading address of each of the spaces, "NOP" (no operation) is stored beforehand. The "NOP" is a certain data string that indicates that nothing is done. The "NOP" is, for example, a data string that is defined beforehand such as "0000_0000h" and "ffff_ffffh".

In an address next to the leading address of each of the spaces, a header that is the control code (/S) of data to be stored is stored, and after that, a payload of data to be stored is stored.

In the embodiment, in the dual port RAM 327, data from "/S" that indicates start to "/T" that indicates termination is regarded as a single piece of data, and pieces of data are stored in different spaces, respectively. For example, when the lane data monitoring unit 324 detects "/T", the lane data monitoring unit 324 reports detection of "/T" to the write pointer 326. When the detection of "/T" is reported to the write pointer 326, the write pointer 326 changes a current memory address of a write pointer value to be output to the dual port RAM 327, to a memory address in another space (for example, next space).

As described above, "NOP" is stored in the leading address of each of the spaces. Thus, in the embodiment, when the write pointer 326 receives report of detection of "/T", the write pointer 326 changes the address of the write pointer value to an address (2nd address) next to the leading address in the next space.

For example, in a case in which the current write pointer value is "02h" in the "A" space, when the write pointer 326 receives report of detection of "/T", the write pointer 326 changes the write pointer value to "21h" in the "B" space.

As described above, the write pointer 326 change the address of the write pointer value to an address in another space for each detection of "/T", so that, in the dual port RAM 327, pieces of data from "/S" to "/T" that are received by the lane data processing unit 321 are stored in different spaces, respectively.

A setting method of an address in each of the spaces is described below.

An address in each of the spaces is set to have different top n bits of the address for each of the space. That is, in an identical space, the top n bits of the addresses are identical. In the embodiment, n=3 is set.

For example, each of the above-described "A" space and "B" space are represented by binary notation.

The "A" space is an area from addresses 0000_0000b to 0001_1111b.
The "B" space is an area from addresses 0010_0000b to 0011_1111b.

It is noted that the last "b" included in the numeric characters of the above-described addresses indicates that the addresses are represented by binary notation. In addition, in order to facilitate the understanding, the binary notation is displayed by inserting "_" for each 4 bits.

As described above, the top three bits of the "A" space is "000", and the top three bits of the "B" space is "001".

The write pointer 326 calculates an address value of a next space to be output from the top three bits of a current write pointer value when the write pointer 326 receives report of detection of "/T".

For example, when the current write pointer value is a value in the "A" space, that is, a value from "00h" (=0000_0000b) to "1Fh" (=0001_1111b), an address value in the next space to be output by the write pointer 326 when report of detection of "/T" is received is a value "0010_0001b (=21h)" that is obtained by combining "001" obtained by adding "1" to the top three bits "000" of an address of the "A" space, and an address "0_0001" (2nd address) next to the leading address.

In FIG. 5, a space of the dual port RAM 327 is divided to four spaces, and the depth (size) of the each of the spaces is set as 20h portion.

In the number of divisions of space, two divisions or more are desired, and it is desirable that, in a case of a system having a short data distance, the number of divisions is increased, a risk of incorrect reading of different data is removed.

In addition, in a system (environment) having a large skew between lanes, it is desirable that depth (area) per one space is set as a large area such as 40h portion in order to compensate a skew.

Returning to FIG. 4, the description is made again.

The read pointer 331 outputs a read pointer value that indicates a reading position of data to each of the dual port RAM 327. The read pointer 331 start count-up of the read pointer value, when the read pointer 331 receives report of detection of "/S" from all of the lane data monitoring units 324. In addition, the read pointer 331 changes the address of the read pointer value to an address of another space when the read pointer 331 receives report of detection of "/T" from the lane data monitoring unit 324.

For example, the read pointer 331 changes the address of the read pointer value to the leading address in the next space when the read pointer 331 receives report of detection of "/T" from the lane data monitoring unit 324.

The calculation of the address in the next space is the same processing as that of the above-described write pointer 326.

For example, when a current read pointer value is a value in the "A" space, that is, a value from "00h" (=0000_0000b) to "1Fh" (=0001_1111b), an address value in the next space to be output by the read pointer 331 when report of detection of "/T" is received is a value "0010_0000b (=20h)" that is obtained by combining "001" obtained by adding "1" to the top three bits "000" of an address in the "A" space, and the leading address "0_0000".

The skew matching/data restoration unit 341 causes skews of lanes to be matched (deskew), and outputs data in each of the lanes other than a redundant lane. In the embodiment, lane 0 data and lane 1 data are output. The skew matching/data restoration unit 341 reads data from the dual port RAM 327-j at the same reading timing.

The skew matching/data restoration unit 341 generates correct data using parity data and outputs the correct data instead of the error data when there is an error in received data.

Data restoration, that is, generation of correct data in the skew matching/data restoration unit 341 is described below.

Figure 6:
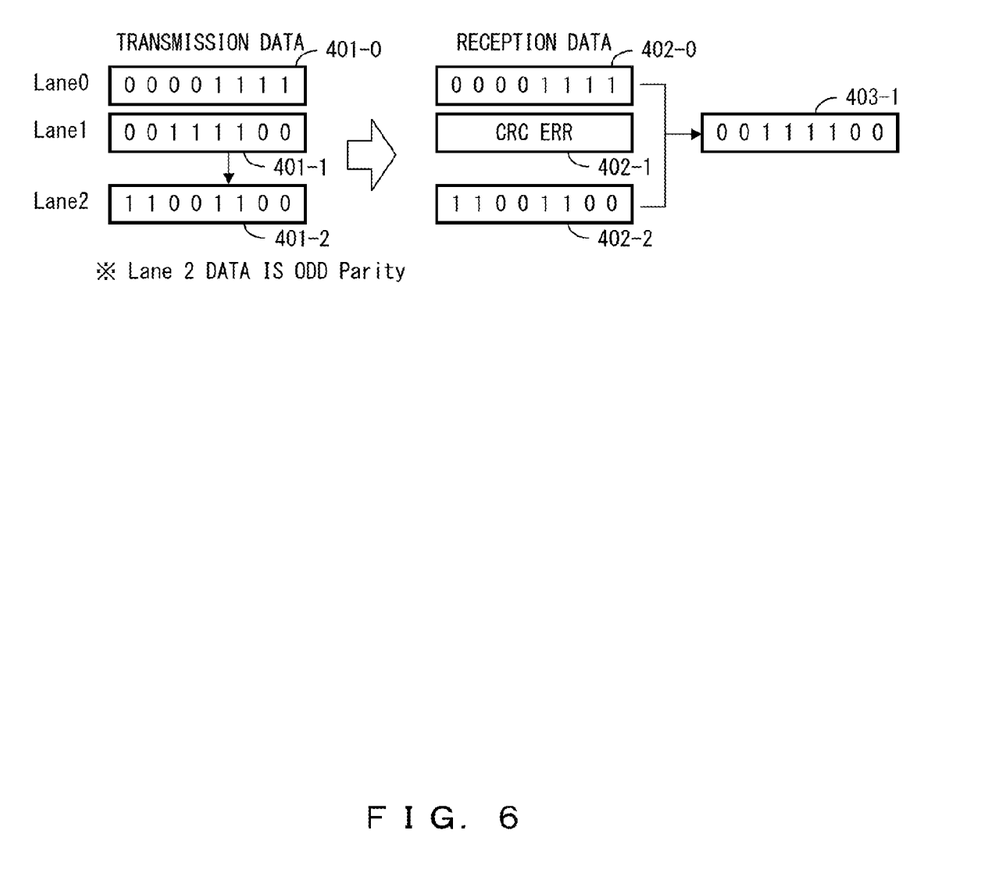
FIG. 6 is an illustrative diagram of data restoration.

FIG. 6 is an illustrative diagram of the data restoration.

Similarly to the above-described case, a case is described below in which serial communication is performed in three lanes and two pieces of data (lane 0 data and lane 1 data) that is obtained by dividing data that is transmission target is transmitted.

On the transmission side, the parity generation unit 202 generates parity data (also referred to as lane 2 data) 401-2 from lane 0 data 401-0 and lane 1 data 401-1. The parity data 401-2 is odd parity of the lane 0 data 401-0 and the lane 1 data 401-1.

The lane 0 data 401-0, the lane 1 data 401-1, and the parity data 401-2 are transmitted to the reception circuit 301 through the lane 0, the lane 1, and the lane 2, respectively.

Here, it is assumed that the error is detected in the lane 1 data 402-1 that is received on the reception side.

In this case, the skew matching/data restoration unit 341 generates correct lane 1 data 403-1 using the received lane 0 data 402-0 and the received parity data 402-2.

The skew matching/data restoration unit 341 outputs the correct lane 1 data 403-1 instead of the lane 1 data 402-1 in which the error is detected.

Figure 7:
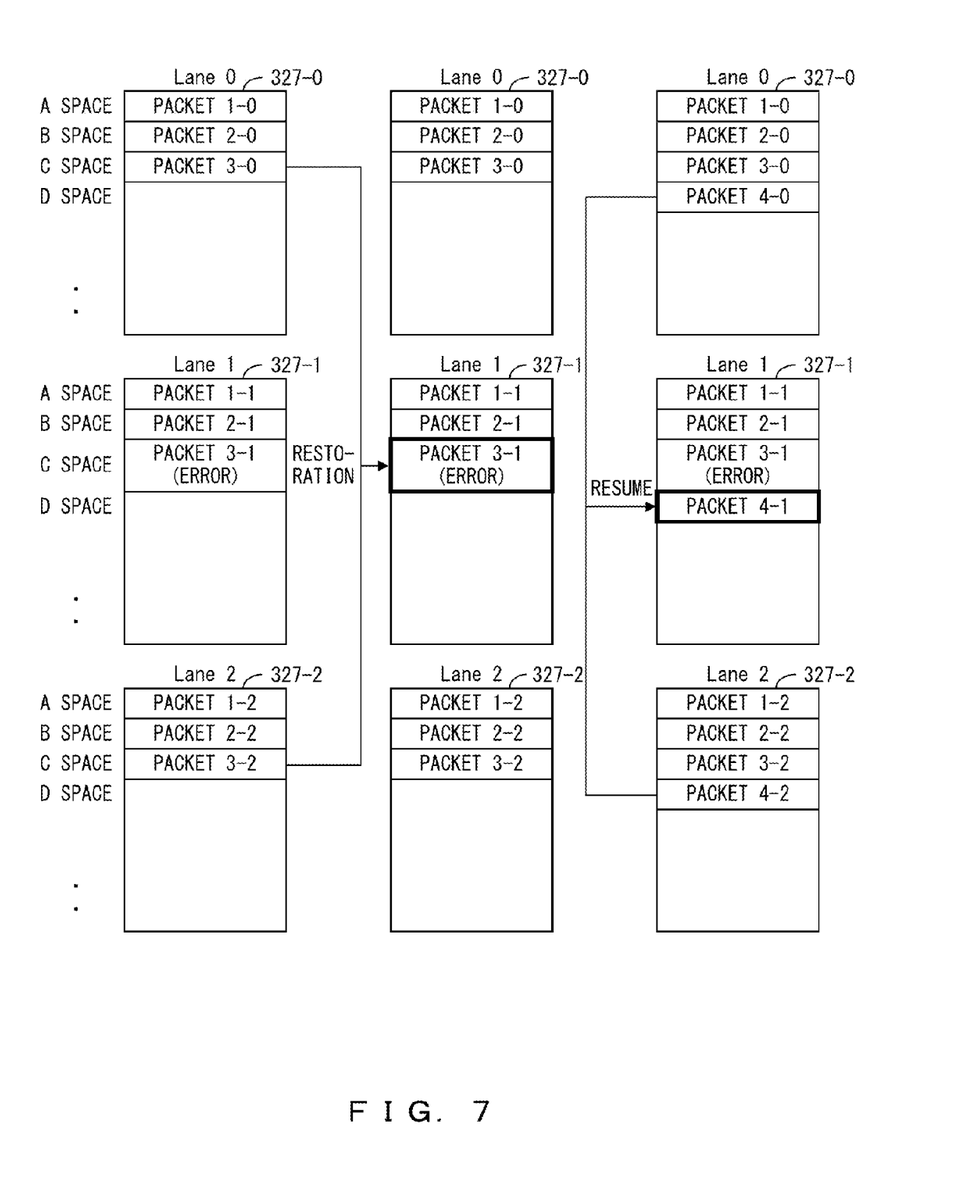
FIG. 7 is a diagram illustrating an example of storage data of a dual port RAM at the time of error occurrence, at the time of error restoration, and at the time of reception of next data.

FIG. 7 is a diagram illustrating an example of storage data of the dual port RAM at the time of error occurrence, at the time of error restoration, and at the time of reception of next data.

On the left side of FIG. 7, the example at the time of error occurrence is illustrated, in the middle of FIG. 7 the example at the time of error restoration is illustrated, and on the right side of FIG. 7, the example at the time of reception of next data is illustrated.

First, in the "A" space of the dual port RAM 327-j (j=0 to 2), a packet 1-j is stored, and in the "B" space of the dual port RAM 327-j, a packet 2-j is stored.

In addition, in the "C" space of the dual port RAM 327-j, a packet 3-j is stored.

Here, it is assumed that there is an error in the packet 3-1 that is stored in the "C" space of the dual port RAM 327-1. In the "C" space of the dual port RAM 327-1, the packet 3-1 (error) with the error therein is stored (on the left side of FIG. 7).

When there is an error in the packet 3-1, the skew matching/data restoration unit 341 generates a correct packet 3-1 from a packet 3-0 and a packet 3-2, and outputs the correct packet 3-1.

It is noted that, even at the time of data restoration, in the "C" space of the dual port RAM 327-1, the packet 3-1 (error) with the error therein remains to be stored (in the middle of FIG. 7).

In addition, the detection of "/T" of the packet 3-j serves as the impetus for changing a write pointer value of the dual port RAM 327-j from the "C" space to the "D" space.

In addition, the dual port RAM 327-j receives a packet 4-j as next data. The dual port RAM 327-j stores the packet 4-j in the "D" space (on the right side of FIG. 7).

When there is an error in the packet 3-1, and there is no validity of contents and an amount of the packet 3-1, so that it is probable that write pointer values are not matched.

Therefore, conventionally, clear (reset) of the dual port RAM 327 or the write pointer 326 is performed.

On the contrary, in the embodiment, when the termination (/T) of data is detected, the write pointer value is changed to an address in the next space. Therefore, in each of the dual port RAM 327, next data is stored from the identical position.

As described above, even when write pointer values are not matched due to the error of data, write pointer values for the next data are matched by changing a space to store data for each piece of data.

Thus, reset of the dual port RAM 327, the write pointer 326, etc. is not desired, thereby preventing the performance from being reduced.

Figure 8:
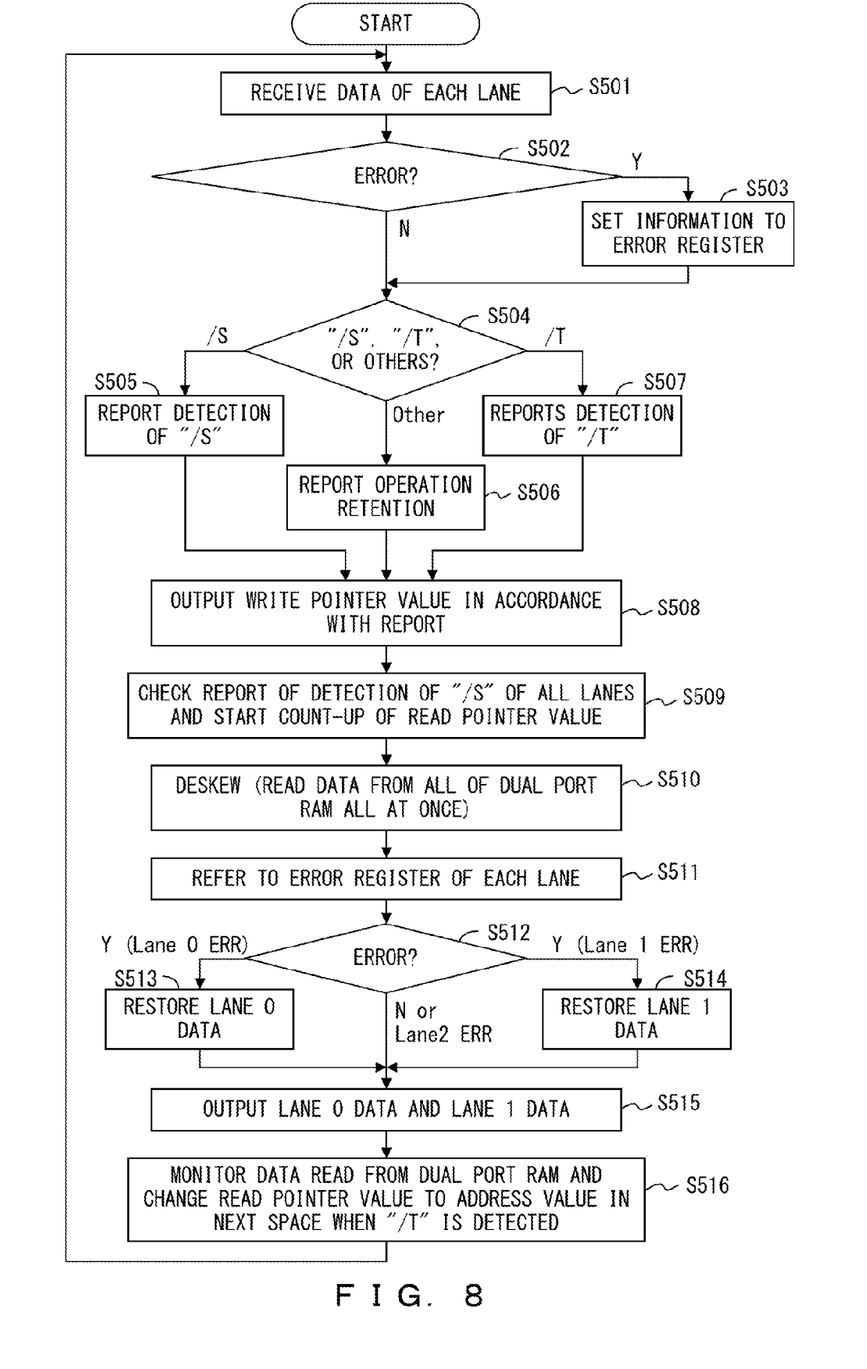
FIG. 8 is a flowchart of reception processing according to an embodiment.

FIG. 8 is a flowchart of the reception processing according to the embodiment.

Processing of the reception circuit that uses three lanes and that is illustrated in FIG. 3 is described below.

In Step S501, the lane data processing unit 321 receives data from the transmission circuit 201 through a lane 301, and the SERDES 205 converts the received data to parallel data.

In Step S502, the CRC checking unit 323 performs error checking of input data. When there is an error, the control proceeds to Step S503, and when there is no error, the control proceeds to Step S504.

In Step S503, the CRC checking unit sets information indicating the presence of error, to the error register 325.

In Step S504, the lane data monitoring unit 326 monitors input data and checks the type of the data. When the data is "/S", the control proceeds to Step S505, and when the data is "/T", the control proceeds to Step S507. When the data is other than "/S" or "/T" (for example, a control code (/i) that indicates idle or CRC for error checking, payload (data), etc.), the control proceeds to Step S506. It is noted that, as described above, "/S" is the control code that indicates start of data, and "/T" is a control code that indicates termination of data.

In Step S505, the lane data monitoring unit 324 reports detection of "/S" to the write pointer 326.

In Step S506, the lane data monitoring unit 324 reports operation retention to the write pointer 326.

In Step S507, the lane data monitoring unit 324 reports detection of "/T" to the write pointer 326 and the read pointer 331.

In Step S508, the write pointer 326 outputs a write pointer value in accordance with report from the lane data monitoring unit 324 to the dual port RAM 327. Specifically, the write pointer 326 starts increment of the write pointer value when the write pointer 326 receives report of detection "/S". In addition, the write pointer 326 continues increment of the write pointer value when the write pointer 326 receives report of operation retention. The write pointer 326 changes the address value of the write pointer value to an address value in the next space when the write pointer 326 receives the report of detection of "/T". It is noted that, regarding the increment of a write pointer value, a write pointer value is incremented by 1 in synchronization with an operation clock of the write pointer 326.

In addition, the dual port RAM 327 writes input data to a position that is indicated by a write pointer value.

In Step S509, the read pointer 331 checks report of detection of "/S" from the lane data monitoring unit 324. In addition, the read pointer 331 starts increment (count-up) of a read pointer value when the read pointer 331 receives report of detection of "/S" from all of the lane data monitoring units 324 (lane data monitoring units 324-0 to 324-2 in the embodiment). After starting the increment of the read pointer value, the read pointer value is incremented by 1 in accordance with an operation clock of the read pointer 331.

In Step S510, the skew matching/data restoration unit 341 reads data from all of the dual port RAM 327 all at once. That is, the skew matching/data restoration unit 341 reads data from all of the dual port RAM 327 at the same reading timing. Here, pieces of data that are read from the dual port RAM 327-0, the dual port RAM 327-1, and the dual port RAM 327-2 are referred to as lane 0 data, lane 1 data, and parity data (lane 2 data), respectively.

In Step S511, the skew matching/data restoration unit 341 refers to the error register 325 of each of the lane data processing units 321.

In Step S512, when information indicating the presence of error is set to the error register 325-0, the control proceeds to Step S513, when information indicating the presence of error is set to the error register 325-1, the control proceeds to Step S514. When information indicating the presence of error in the error register 325-2 is set, or when information indicating the presence of error in the error register 325-0 and the error register 325-1 is not set, the control proceeds to Step S515.

In Step S513, the skew matching/data restoration unit 341 generates the correct lane 0 data using the lane 1 data and the parity data. It is noted that the generation method of correct data is as described in FIG. 6. In addition, the skew matching/data restoration unit 341 uses the generated correct lane 0 data as lane 0 data instead of the lane 0 data with the error therein and is read from the dual port RAM 327-0.

In Step S514, the skew matching/data restoration unit 341 generates the correct lane 1 data using the lane 0 data and the parity data. In addition, the skew matching/data restoration unit 341 uses the generated correct lane 1 data as lane 1 data instead of the lane 1 data with the error therein and is read from the dual port RAM 327-1.

In Step S515, the skew matching/data restoration unit 341 outputs the lane 0 data and the lane 1 data.

In Step S516, the skew matching/data restoration unit 341 monitors data that is read from the dual port RAM 327, and reports detection of "/T" to the read pointer 331 when "/T" is detected. The read pointer 331 changes an address of a read pointer value to an address value in the next space (for example, the leading address value in the next space) when the read pointer 331 receives the report of detection of "/T", and holds the changed value.

Figure 9:
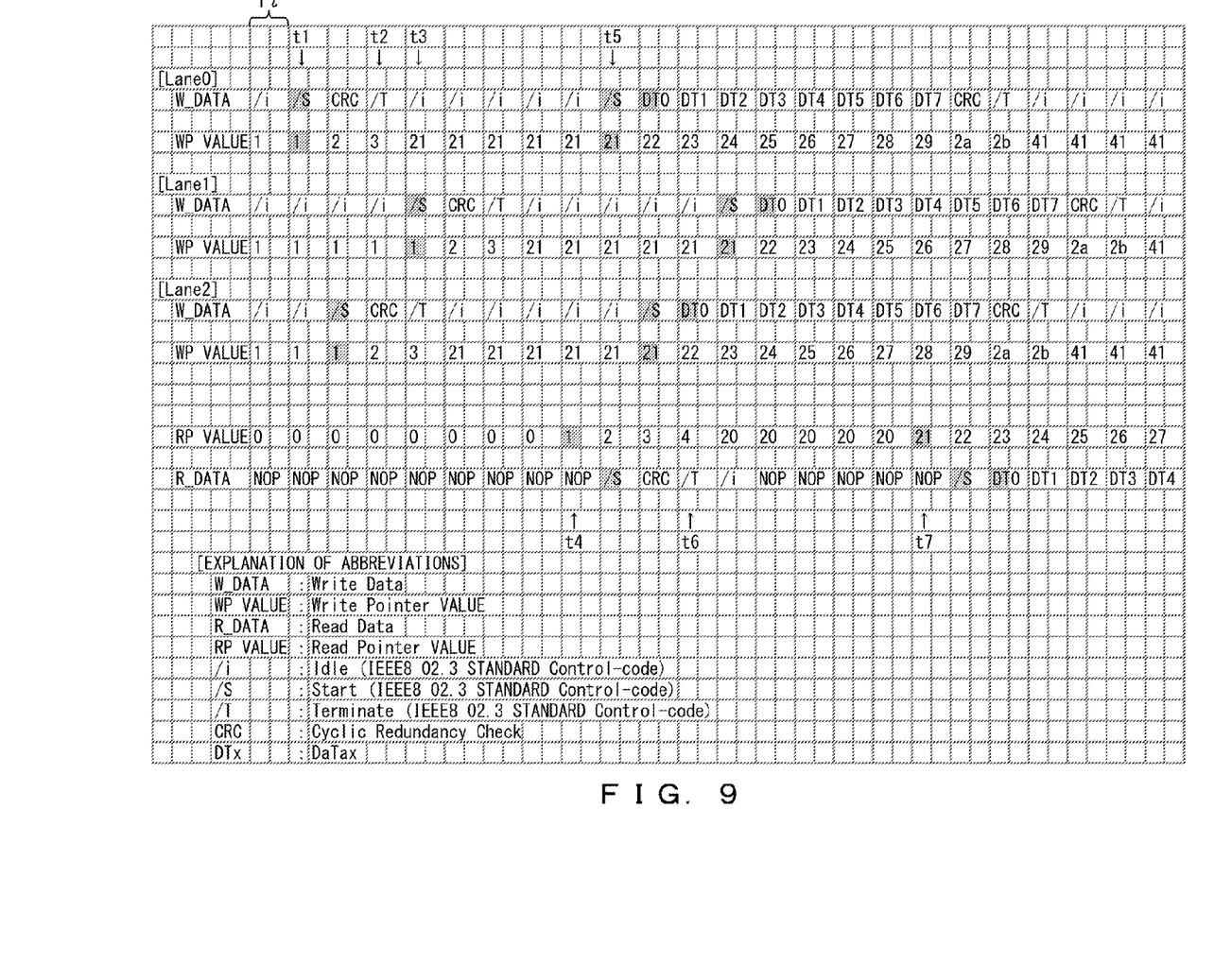
FIG. 9 is a time chart of the reception circuit according to the embodiment.

FIG. 9 is a time chart of the reception circuit according to the embodiment.

The pieces of data that are illustrated in FIG. 9 are, in order from the top, an output of the lane data monitoring unit 324-0 (that is, write data of the dual port RAM 327-0), a write pointer value that is output by the write pointer 326-0, an output of the lane data monitoring unit 324-1 (that is, write data of the dual port RAM 327-1), a write pointer value that is output by the write pointer 326-1, an output of the lane data monitoring unit 324-0 (that is, write data of the dual port RAM 327-2), a write pointer value that is output by the write pointer 326-2, a read pointer value, and read data that is read from the dual port RAM 327-0. In addition, the output of the lane data monitoring unit 324-0, the output of the lane data monitoring unit 324-1, and the output of the lane data monitoring unit 324-2 may be referred to as lane 0 data, lane 1 data, and lane 2 data, respectively.

In addition, a write pointer value and a read pointer value of FIG. 9 are represented by hexadecimal notation.

The horizontal direction of the time chart of FIG. 9 is time axis, and two scale portions indicate 1T.

A case is described below in which data that has skew of $3\pi$ portions between the lane 0 and the lane 1, and skew of $1\pi$ between the lane 0 and the lane 2 is received.

At the time t1, the dual port RAM 327-0 starts to receives data while starting with "/S", and stores the received data in accordance with a write pointer value.

At the time t2, the lane data monitoring unit 324-0 reports detection of "/T" to the write pointer 326-0 when the lane data monitoring unit 324-0 receives "/T".

At the time t3, the write pointer 326-0 that receives the report of detection of "/T" changes the address of the write pointer value to an address in the next space. Specifically, the write pointer 326-0 changes the address of the write pointer value to the address "21h" in the "B" space because the current write pointer value is the address "03h" in the "A" space.

In addition, "/T" is detected in the lane data monitoring unit 324-2 and the lane data monitoring unit 324-1 after $1\pi$ and $3\pi$ of the time t2, respectively. Therefore, write pointer values are changed to addresses in the next spaces in the write pointers 326-2 and 326-1 after $1\pi$ and $3\pi$ of the time t3, respectively. It is noted that the write pointer value that is changed to an address in another space is not incremented until the next "/S" is detected.

In addition, at the time t3, the lane data monitoring unit 324-1 reports detection of "/S" to the read pointer 331 because the lane data monitoring unit 324-1 detects "/S". As a result, the read pointer 331 starts increment of a read pointer value because the read pointer 331 receives reports of detection of "/S" from all of the lane data monitoring units 324. At the time t4, that is, after $4\pi$ of the time t3, the read pointer 331 starts increment of the read pointer value because about $4\pi$ is desired to synchronize pieces of information.

At the time t5, the lane data monitoring unit 324-0 reports detection of "/S" to the write pointer 326-0 because the lane data monitoring unit 324-0 receives "/S".

In addition, the write pointer 326-0 that receives the report of detection "/S" starts increment of a write pointer value. As illustrated in FIG. 9, after the time t5, an output (write pointer value) of the write pointer 326-0 is incremented from "21h".

At the time t6, "/T" is read as read data, the skew matching/data restoration unit 341 reports detection of "/T" to the read pointer 331. In addition, the read pointer 331 that receives the report of detection of "/T" changes the address of the read pointer value to an address in the next space. Specifically, the read pointer 331 changes the read pointer value to the leading address "20h" in the "B" space because the current read pointer value is "04h" in the "A" space.

In addition, after $1\pi$ and $3\pi$ of the time t5, "/S" is detected in the lane data monitoring unit 324-2 and the lane data monitoring unit 324-1, respectively, and "/S" is detected in all of the lane data monitoring units 324. Similarly to the above-described case, at the time t7, that is, after $4\pi$ of the detection of "/S" in all of the lane data monitoring units 324, increment of a read pointer value is started.

Figure 10:
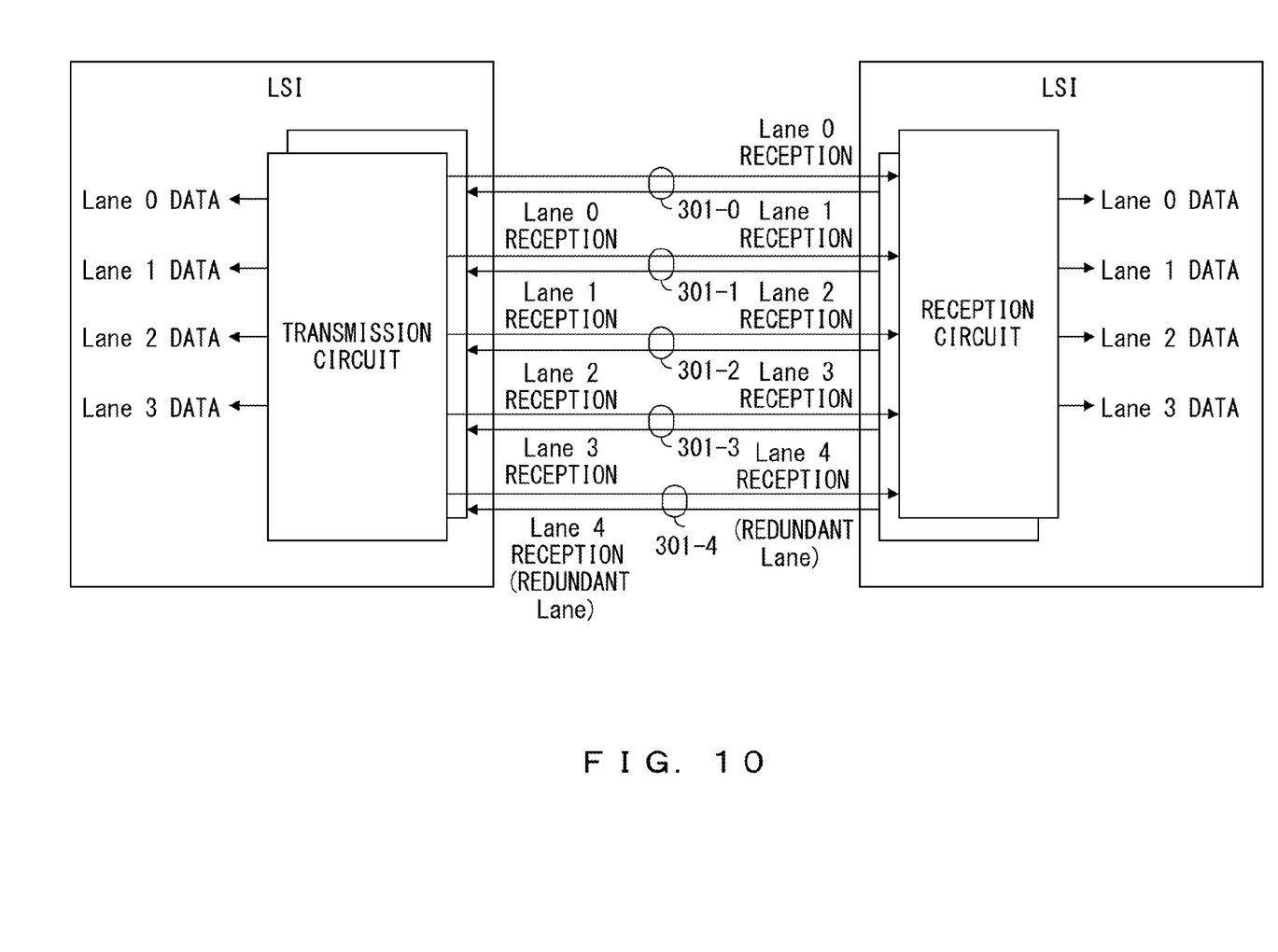
FIG. 10 is an overall diagram of a transmission circuit and a reception circuit according to another embodiment.

FIG. 10 is an overall diagram of a transmission circuit and reception circuit according to another embodiment.

In the above-described embodiment, the serial communication using three lanes is performed, however the number of lanes is not limited to three.

For example, as illustrated in FIG. 10, serial communication between a transmission circuit and a reception circuit may be performed by using five of lanes 301-m (m=0 to 4).

In the transmission circuit and the reception circuit according to another embodiment, the lane 301-4 is used as a redundant lane. That is, parity data that is generated from data that is transmitted in the lanes 301-0 to 301-3 is transmitted through the lane 301-4.

Figure 11:
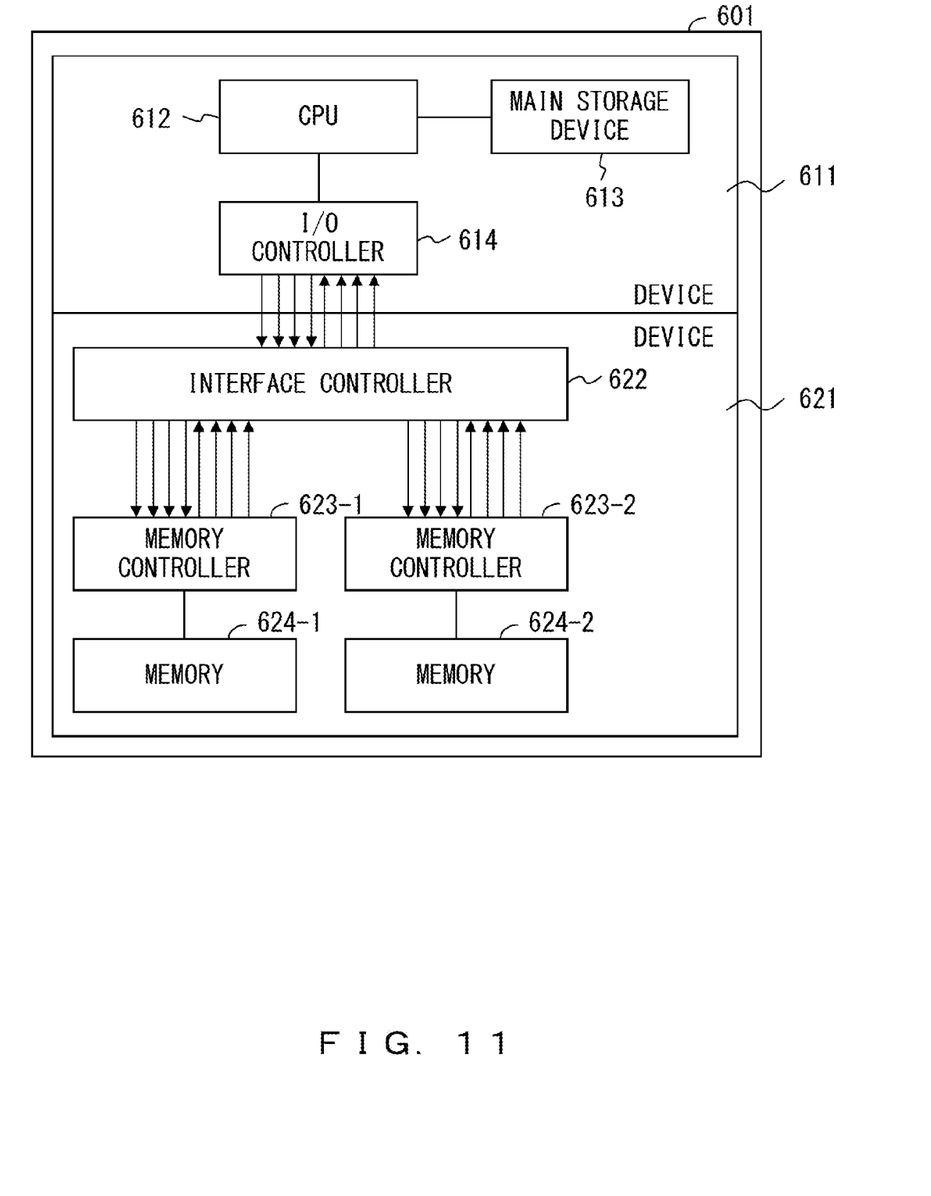
FIG. 11 is a configuration diagram of an information processing apparatus according to an embodiment.

FIG. 11 is a configuration diagram of an information processing apparatus according to an embodiment.

An information processing apparatus 601 is, for example, a personal computer or a server.

The information processing apparatus 601 includes a device 611 and a device 621.

Each of the device 611 and the device 621 is, for example, a system board, an I/O board, and a backplane board.

The device 611 includes a central processing unit (CPU) 612, a main storage device 613, and an I/O controller 614.

The CPU 612 is a processor that performs various pieces of processing.

The main storage device 613 is a storage device that temporarily stores data. The main storage device 613 is, for example, a random access memory (RAM).

The I/O controller 614 performs control of transmission and reception of data between the device 611 and the device 621. The I/O controller 641 is connected to an interface controller 622 through a serial bus, and performs communication by high speed serial transmission.

The device 621 includes the interface controller 622, memory controllers 623-k (k=1 to 2), and memories 624-k.

The interface controller 622 is connected to the I/O controller 614 and the memory controller 623, and controls transmission and reception of data between the interface controller 622 and the I/O controller 641, and between the interface controller 622 and the memory controller 623.

The interface controller 622 is connected to the memory controller 623 through a serial bus, and performs communication by high speed serial transmission.

The memory controller 623 controls writing and reading of data in the memory 624.

The memory 624 is a storage device that stores data temporarily. The memory 624 is, for example, a random access memory (RAM).

The I/O controller 614, the interface controller 622, and the memory controller 623 correspond to the LSI 101 and 111 of FIG. 2.

The transmission circuits 201 and 211 and reception circuits 301 and 311 according to the embodiment are mounted to circuits that are connected to each other through the serial bus. That is, the transmission circuits 201 and 211 and reception circuits 301 and 311 according to the embodiment are mounted, for example, on the I/O controller 614, the interface controller 622, and the memory controller 623.

In the reception circuit according to the embodiment, because redundant data is received, correct data can be obtained thanks to error correction even when an error occurs in the received data. Therefore, re-transmission is not desired at the time of occurrence of an error.

In addition, in the reception circuit according to the embodiment, writing of data and switching of reading spaces are performed at the termination (/T) of a packet even after occurrence of an error, so that new data is overwritten, and the mere overwritten data is read even when garbage (old) data is left, thereby preventing failure such as reading of garbage data. Thus, at the time of error occurrence, reset of dual port RAM is not desired, and data transfer can be continued.

All examples and conditional language provided herein are intended for pedagogical purposes to aiding the reader in understanding the invention and the concepts contributed by the inventor to further the art, and are not to be construed as being limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A reception circuit that receives data and redundant data for the received data by serial communication in a plurality of lanes, the reception circuit comprising:
    a plurality of error checking units each of which checks presence of an error in the received data or the received redundant data, and is provided for each lane;
    a plurality of memories each of which stores the checked received data or the checked received redundant data, and is provided for each lane;
    a processing unit that reads the checked received data from the plurality of memories at a same reading timing, and outputs a read data;
    a plurality of write pointer units each of which outputs a write pointer value that indicates a writing position of the checked received data to the memory and is provided for each lane; and
    a plurality of data monitoring units each of which reports reception termination of the checked received data to the corresponding one of the plurality of write pointer units and is provided for each lane, wherein
    the plurality of lanes include a redundant lane that transmits the redundant data,
    the checked received data or the checked received redundant data is stored in a first area of a plurality of areas that are included in each of the plurality of memories, and other checked received data that is received next to the received data is stored in a second area of the plurality of areas,
    when there is an error in any one of the pieces of checked received data that are stored in the respective first areas of the plurality of memories, the processing unit generates correct data using the checked redundant data that is stored in the first area of the memory, and outputs the correct data instead of the received data with the error therein,
    each of the plurality of write pointer units outputs an address of the first area in which the checked received data is stored as the write pointer value, and outputs an address of the second area as the write pointer value when reception termination of the checked received data is reported, and
    the memories store data that is input in a position that is indicated by the write pointer value.

2. The reception circuit according to claim 1, wherein
    the plurality of data monitoring units report reception start of the checked received data to the plurality of write pointer units, respectively, and
    each of the plurality of write pointer units starts increment of the write pointer value when the reception start of the checked received data is reported.

3. The reception circuit according to claim 1 further comprising:
    a read pointer unit that outputs a read pointer value that indicates a reading position of the checked received data to the plurality of memories, wherein
    the processing unit reports reading termination of the read data to the read pointer unit,
    the read pointer unit outputs an address of the first area in which the checked received data is stored as the read pointer value, and outputs an address of the second area as the read pointer value when reading termination of the read data is reported, and
    each of the plurality of memories outputs data that is stored in a position that is indicated by the read pointer value.

4. The reception circuit according to claim 3, wherein
    each of the plurality of data monitoring units reports reception start of the checked received data to the read pointer unit,
    the read pointer unit starts increment of the read pointer value when the read pointer unit receives reports of the reception start of the checked received data from all of the plurality of data monitoring units.

5. An information processing apparatus that includes a reception circuit that receives data and redundant data for the received data by serial communication in a plurality of lanes, the reception circuit comprising:
    a plurality of error checking units each of which checks presence of an error in the received data or the received redundant data, and is provided for each lane;

a plurality of memories each of which stores the checked received data or the checked received redundant data, and is provided for each lane;

a processing unit that reads the checked received data from the plurality of memories at a same reading timing, and outputs a read data;

a plurality of write pointer units each of which outputs a write pointer value that indicates a writing position of the checked received data to the memory and is provided for each lane; and a plurality of data monitoring units each of which reports reception termination of the checked received data to the corresponding one of the plurality of write pointer units and is provided for each lane, wherein the plurality of lanes include a redundant lane that transmits the redundant data, the checked received data or the checked received redundant data is stored in a first area of a plurality of areas that are included in each of the plurality of memories, and other checked received data that is received next to the received data is stored in a second area of the plurality of areas, when there is an error in any one of the pieces of checked received data that are stored in the respective first areas of the plurality of memories, the processing unit generates correct data using the checked redundant data that is stored in the first area of the memory, and outputs the correct data instead of the received data with the error therein, each of the plurality of write pointer units outputs an address of the first area in which the checked received data is stored as the write pointer value, and outputs an address of the second area as the write pointer value when reception termination of the checked received data is reported, and the memories store data that is input in a position that is indicated by the write pointer value.

6. A control method of a reception circuit that receives data by serial communication in a plurality of lanes, the control method comprising:

receiving received data and redundant data for the received data;

checking presence of an error in the received data and the received redundant data;

storing the checked received data and the checked received redundant data in a plurality of memories;

reading the checked received data from the plurality of memories at a same reading timing and outputting the read data;

outputting a write pointer value that indicates a writing position of the checked received data to the plurality of memories; and reporting reception termination of the checked received data to the corresponding one of a plurality of write pointer units, wherein in the storing, the checked received data or the checked received redundant data is stored in a first area of a plurality of areas that are included in each of the plurality of memories, and other checked received data that is received next to the received data is stored in a second area of the plurality of areas, in the outputting the read data, when there is an error in any one of the pieces of checked received data that are stored in the respective first areas of the plurality of memories, correct data is generated using the checked received redundant data that is stored in the first area of the memory, and the correct data is output instead of the received data with the error therein, the outputting the write pointer value outputs an address of the first area in which the checked received data is stored as the write pointer value, and outputs an address of the second area as the write pointer value when reception termination of the checked received data is reported, and the storing stores data that is input in a position that is indicated by the write pointer value.

* * * * *